US006713425B2

(12) United States Patent
Mink et al.

(10) Patent No.: US 6,713,425 B2
(45) Date of Patent: Mar. 30, 2004

(54) ONE POT PREPARATION OF BIMETALLIC CATALYSTS FOR ETHYLENE 1-OLEFIN COPOLYMERIZATION

(75) Inventors: Robert I. Mink, Warren, NJ (US); Yury V. Kissin, East Brunswick, NJ (US); Thomas E. Nowlin, West Windsor Township, NJ (US); Pradeep P. Shirodkar, Belle Mead, NJ (US); Grace O. Tsien, Colonia, NJ (US); Sandra D. Schregenberger, Neshanic, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/161,534

(22) Filed: Jun. 3, 2002

(65) Prior Publication Data

US 2003/0032550 A1 Feb. 13, 2003

Related U.S. Application Data

(63) Continuation of application No. 08/621,566, filed on Mar. 25, 1996, now Pat. No. 6,417,130.

(51) Int. Cl.⁷ .................................................. B01J 31/00
(52) U.S. Cl. ........................ 502/113; 502/152; 502/115; 502/103; 526/160; 526/943
(58) Field of Search .................................. 502/152, 113, 502/115, 103; 526/160, 943

(56) References Cited

U.S. PATENT DOCUMENTS

| | | | |
|---|---|---|---|
| 2,924,593 A | 2/1960 | Breslow | 260/94.9 |
| 3,242,099 A | 3/1966 | Manyik et al. | 252/429 |
| 3,950,269 A | 4/1976 | Setterquist | 252/430 |
| 4,188,470 A | 2/1980 | Collina et al. | 526/64 |
| 4,299,936 A | 11/1981 | Candlin et al. | 526/119 |
| 4,310,648 A | 1/1982 | Shipley et al. | 526/114 |
| 4,324,691 A | 4/1982 | Hartshorn et al. | 252/429 B |
| 4,329,252 A | 5/1982 | Gavens et al. | 252/429 B |
| 4,338,424 A | 7/1982 | Morita et al. | 526/65 |
| 4,356,111 A | 10/1982 | Shipley et al. | 252/429 B |
| 4,399,053 A | 8/1983 | Shipley et al. | 252/429 B |
| 4,402,861 A | 9/1983 | Hoff | 252/429 B |
| 4,404,344 A | 9/1983 | Sinn et al. | 526/160 |
| 4,414,369 A | 11/1983 | Kuruda et al. | 526/65 |
| 4,420,592 A | 12/1983 | Kato et al. | 526/65 |
| 4,446,288 A | 5/1984 | Hoff | 526/129 |
| 4,518,751 A | 5/1985 | Mizogami et al. | 526/114 |
| 4,525,550 A | 6/1985 | Warzelhan et al. | 526/116 |
| 4,530,914 A | 7/1985 | Ewen et al. | 502/113 |
| 4,536,484 A | 8/1985 | Lacombe et al. | 502/62 |
| 4,542,199 A | 9/1985 | Kaminsky et al. | 526/160 |
| 4,554,265 A | 11/1985 | Graves | 502/113 |
| 4,568,659 A | 2/1986 | Warzelhan et al. | 502/111 |
| 4,578,373 A | 3/1986 | Graves | 502/113 |
| 4,618,660 A | 10/1986 | Graves | 526/114 |
| 4,658,078 A | 4/1987 | Slaugh et al. | 585/512 |
| 4,659,685 A | 4/1987 | Coleman, III | 502/113 |
| 4,665,047 A | 5/1987 | Slaugh et al. | 502/108 |
| 4,701,432 A | 10/1987 | Welborn, Jr. | 502/113 |
| 4,703,094 A | 10/1987 | Raufast | 526/65 |
| 4,707,530 A | 11/1987 | Johnson | 526/129 |

(List continued on next page.)

FOREIGN PATENT DOCUMENTS

| | | |
|---|---|---|
| EP | 0516458 | 4/1992 |
| EP | 0515132 | 5/1992 |
| WO | WO95/13871 | 5/1995 |

OTHER PUBLICATIONS

US 5,242,876, 9/1993, Shamshoum et al. (withdrawn)
Kaminsky et al, Angew, Chem. Int. Ed. Engl. vol. 15 (1976), p. 629.
Kaminsky, Walter, "Living Polymers" on Polymerization with Extremely Productive Ziegler Catalysts, Angewandte Chemie International Edition in English 19/5 (1980), p. 390–392.
Kaminsky, Walter, "Bis(cyclopentadienyl)zirkon–Verbindungen und Aluminoxan als Ziegler–Katalysatoren für die Polymerisation und Copolymerisation von Olefinen", Makromol. Chem., Rapid Commun. 4, p. 417–421 (1983).
Kaminsky, Walter, "Influence of Hydrogen on the Polymerization of Ethylene with the Homogeneous Ziegler System Bis(cyclopentadienyl)zirconiumdichloride/aluminoxane" Makromol. Chem. 225 (1984).
Kaminsky, Walter, "Isotactic Polymerization of Propene with (n–1,1'–ethylenedi–4,5,6,7–tetrahydroindenyl)zirconium dichloride Combined with Methylaluminoxane" Makromol. Chem. Rapid Commun. 8, 305–310 (1987).
Dissertation of Andresen with Translation, UV spektoskopische Untersuchungen . . . als Katalysatorkompohente, 1980.
Diplomarbeit of Kulper with Translation, "Homogene, Chlorhaltige . . . –von(CpMe5)2ZrCl2 . . . von Cp2Zr Cl2 . . . von Ethen", 1981.
Dissertation of Hahnsen with Translation, "Kinetische und mechanistische . . . und Methylaluminoxan", 1985.
Dissertation of Kulper with Translation, "Polymerisationsverhalten von loslichen . . . gegenuber 1–Olefinen", 1985.
Herwig Dissertation with Translation Enclosed, "Olefinpolymerisation mit loslichen, . . . Aluminiumalkylkomponente".

*Primary Examiner*—Ling-Siu Choi

(57) ABSTRACT

A process of forming a bimetallic catalyst composition comprising a cocatalyst (a trialkylaluminum compound) and a catalyst precursor. The precursor comprises at least two transition metals; a metallocene complex is a source of one of said two transition metals. The precursor is produced in a single-pot process by contacting a porous carrier, in sequence, with a dialkylmagnesium compound, an aliphatic alcohol, a non-metallocene transition metal compound, a contact product of a metallocene complex and a trialkylaluminum compound, and methylalumoxane.

9 Claims, 1 Drawing Sheet

U.S. PATENT DOCUMENTS

| | | | |
|---|---|---|---|
| 4,710,552 A | 12/1987 | Bachl et al. | 526/116 |
| 4,752,597 A | 6/1988 | Turner | 502/104 |
| 4,769,510 A | 9/1988 | Kaminsky et al. | 585/512 |
| 4,794,096 A | 12/1988 | Ewen | 502/117 |
| 4,808,561 A | 2/1989 | Welborn, Jr. | 502/104 |
| 4,814,540 A | 3/1989 | Watanabe et al. | 585/523 |
| 4,820,786 A | 4/1989 | Bacskai | 526/152 |
| 4,871,704 A | 10/1989 | Kohara et al. | 502/114 |
| 4,874,734 A | 10/1989 | Kioka et al. | 502/104 |
| 4,897,455 A | 1/1990 | Welborn, Jr. | 526/129 |
| 4,910,272 A | 3/1990 | Marchand et al. | 526/129 |
| 4,912,075 A | 3/1990 | Chang | 502/107 |
| 4,914,253 A | 4/1990 | Chang | 585/523 |
| 4,918,038 A | 4/1990 | Samuels et al. | 502/112 |
| 4,923,833 A | 5/1990 | Kioka et al. | 502/9 |
| 4,925,821 A | 5/1990 | Chang | 502/107 |
| 4,931,517 A | 6/1990 | Fujita | 526/128 |
| 4,933,403 A | 6/1990 | Kaminsky et al. | 526/160 |
| 4,935,397 A | 6/1990 | Chang | 502/117 |
| 4,937,217 A | 6/1990 | Chang | 502/111 |
| 4,937,301 A | 6/1990 | Chang | 526/128 |
| 4,939,217 A | 7/1990 | Stricklen | 526/114 |
| 4,952,540 A | 8/1990 | Kioka et al. | 502/9 |
| 4,962,248 A | 10/1990 | Winter et al. | 585/12 |
| 4,962,262 A | 10/1990 | Winter et al. | 585/512 |
| 4,980,330 A | 12/1990 | Marchand et al. | 502/115 |
| 5,001,205 A | 3/1991 | Hoel | 526/128 |
| 5,006,500 A | 4/1991 | Chang | 502/107 |
| 5,008,228 A | 4/1991 | Chang | 502/111 |
| 5,021,595 A | 6/1991 | Datta | 556/42 |
| 5,023,388 A | 6/1991 | Luker | 585/9 |
| 5,026,797 A | 6/1991 | Takahashi | 526/124 |
| 5,032,562 A * | 7/1991 | Lo et al. | 502/111 |
| 5,043,515 A | 8/1991 | Slaugh et al. | 585/512 |
| 5,049,535 A | 9/1991 | Resconi et al. | 502/117 |
| 5,055,438 A | 10/1991 | Canich | 502/117 |
| 5,057,475 A | 10/1991 | Canich et al. | 502/104 |
| 5,066,631 A | 11/1991 | Sangokoya et al. | 502/152 |
| 5,077,255 A | 12/1991 | Welborn, Jr. | 502/104 |
| 5,082,817 A | 1/1992 | Albizzati et al. | 502/102 |
| 5,086,024 A | 2/1992 | Crapo et al. | 502/117 |
| 5,086,135 A | 2/1992 | Kissin | 526/151 |
| 5,087,788 A | 2/1992 | Wu | 585/512 |
| 5,091,352 A | 2/1992 | Kioka et al. | 502/103 |
| 5,120,696 A | 6/1992 | Tsutsui et al. | 502/113 |
| 5,122,491 A | 6/1992 | Kioka et al. | 502/117 |
| 5,126,301 A | 6/1992 | Tsutsui et al. | 502/108 |
| 5,126,303 A | 6/1992 | Resconi et al. | 502/117 |
| 5,132,262 A | 7/1992 | Rieger et al. | 502/117 |
| 5,132,381 A | 7/1992 | Winter et al. | 526/160 |
| 5,145,819 A | 9/1992 | Winter et al. | 502/117 |
| 5,147,949 A | 9/1992 | Chang | 526/129 |
| 5,157,008 A | 10/1992 | Sangokoya et al. | 502/111 |
| 5,162,278 A | 11/1992 | Razavi | 502/152 |
| 5,171,799 A | 12/1992 | Kioka et al. | 26/127 |
| 5,171,871 A | 12/1992 | Miyashita | 556/27 |
| 5,171,919 A | 12/1992 | Watanabe et al. | 585/523 |
| 5,173,464 A | 12/1992 | Pettijohn et al. | 502/104 |
| 5,182,244 A | 1/1993 | Pettijohn | 502/110 |
| 5,189,000 A | 2/1993 | Masi et al. | 502/113 |
| 5,196,496 A | 3/1993 | Galimberti et al. | 526/348.6 |
| 5,198,399 A | 3/1993 | Hoff et al. | 502/111 |
| 5,206,197 A | 4/1993 | Campbell, Jr. | 502/103 |
| 5,206,199 A | 4/1993 | Kioka et al. | 502/117 |
| 5,208,304 A | 5/1993 | Waymouth | 526/164 |
| 5,216,095 A | 6/1993 | Dolle et al. | 526/127 |
| 5,223,465 A | 6/1993 | Ueki et al. | 502/117 |
| 5,225,500 A | 7/1993 | Elder et al. | 526/127 |
| 5,234,878 A | 8/1993 | Tsutsui et al. | 502/103 |
| 5,238,891 A | 8/1993 | Miro | 502/104 |
| 5,238,892 A | 8/1993 | Chang | 502/111 |
| 5,240,894 A | 8/1993 | Burkhardt et al. | 502/108 |
| 5,241,025 A | 8/1993 | Hlatky et al. | 526/129 |
| 5,258,342 A | 11/1993 | Luciani et al. | 502/107 |
| 5,260,244 A | 11/1993 | Pettijohn | 502/115 |
| 5,278,117 A | 1/1994 | Luciani et al. | 502/113 |
| 5,281,679 A | 1/1994 | Jejelowo et al. | 526/114 |
| 5,304,523 A | 4/1994 | Razavi | 502/152 |
| 5,317,036 A | 5/1994 | Brady, III et al. | 523/223 |
| 5,324,800 A | 6/1994 | Welborn, Jr. et al. | 526/160 |
| 5,329,033 A | 7/1994 | Spaleck et al. | 556/53 |
| 5,332,706 A | 7/1994 | Nowlin et al. | 502/107 |
| 5,340,786 A | 8/1994 | Tsutsui et al. | 502/117 |
| 5,347,025 A | 9/1994 | Yamada et al. | 556/11 |
| 5,348,926 A | 9/1994 | Yamada et al. | 502/117 |
| 5,350,817 A | 9/1994 | Winter et al. | 526/119 |
| 5,359,015 A | 10/1994 | Jejelowo | 526/114 |
| 5,372,682 A | 12/1994 | Devore et al. | 204/72 |
| 5,373,072 A | 12/1994 | Chang | 526/129 |
| 5,374,700 A | 12/1994 | Tsutsui et al. | 526/348.3 |
| 5,384,298 A | 1/1995 | Inahara et al. | 502/104 |
| 5,385,877 A | 1/1995 | Fujita et al. | 502/103 |
| 5,395,810 A | 3/1995 | Shamshoum et al. | 502/113 |
| 5,399,636 A | 3/1995 | Alt et al. | 526/129 |
| 5,409,874 A | 4/1995 | Imuta et al. | 502/103 |
| 5,412,131 A | 5/1995 | Sangokoya | 556/175 |
| 5,416,053 A | 5/1995 | Bai et al. | 502/128 |
| 5,416,178 A | 5/1995 | Winter et al. | 526/160 |
| 5,416,179 A | 5/1995 | Welch et al. | 526/160 |
| 5,422,325 A | 6/1995 | Jejelowo et al. | 502/104 |
| 5,434,116 A | 7/1995 | Sone et al. | 502/103 |
| 5,436,305 A | 7/1995 | Alt et al. | 526/160 |
| 5,451,649 A | 9/1995 | Zenk et al. | 526/160 |
| 5,453,475 A | 9/1995 | Rieger et al. | 526/160 |
| 5,455,316 A | 10/1995 | Tsutsui et al. | 526/114 |
| 5,455,365 A | 10/1995 | Winter et al. | 556/7 |
| 5,459,217 A | 10/1995 | Todo et al. | 526/348.1 |
| 5,466,649 A | 11/1995 | Jejelowo | 502/120 |
| 5,525,678 A | 6/1996 | Mink et al. | 525/246 |

\* cited by examiner

ONE POT PREPARATION OF BIMETALLIC CATALYSTS FOR ETHYLENE 1-OLEFIN COPOLYMERIZATION

CROSS REFERENCE TO RELATED APPLICATIONS

This application is a continuation U.S. Ser. No. 08/621,566, filed Mar. 25, 1996 now U.S. Pat. No. 6,417,130, now allowed, the entire disclosure of which is expressly incorporated herein by reference.

FIELD OF THE INVENTION

The invention relates to the production of bimetallic ethylene polymerization catalysts systems containing two sources of transition metals for the production of broad and/or bimodal molecular weight distribution (MWD) polyethylene resins in a single reactor. In a preferred embodiment, the invention relates to the production of titanium/zirconium-based bimetallic catalyst systems that produce broad and/or bimodal MWD polyethylene resins in a single reactor. The low molecular weight (LMW) polymer component in the resin is produced by the Zr active centers, while the high molecular weight (HMW) polymer component is produced by the Ti active centers. The relative productivity of the two active centers determines the ratio of the HMW and the LMW polymer components in the final resin.

This invention particularly relates to a new procedure for preparing bimetallic catalysts. This procedure results in bimetallic catalysts with a more uniform inter-particle distribution of the metals which produce the HMW and LMW polymer components.

The uniform inter-particle distribution of the metals in the catalyst results in the reduction of gel particles in polyethylene film. Gel particles are attributable to high molecular weight polymer components which are substantially greater in molecular weight than the surrounding matrix resin. The presence of gels in polyethylene film interfere with the film-forming process, reduce film toughness properties and lower the film quality rating (FQR) and, hence, must be avoided.

SUMMARY OF THE INVENTION

This invention relates to supported bimetallic ethylene polymerization catalysts with improved inter-particle distribution of the Zr active centers and facilitates the scale-up production of the catalyst. This invention also includes a new procedure for preparing bimetallic catalysts.

The invention relates to the production of bimetallic catalyst systems for ethylene polymerization containing two transition metals. These catalysts produce broad/bimodal MWD polyethylene resins in a single reactor. In a preferred embodiment, the invention relates to the production of titanium/zirconium-based bimetallic catalyst systems that produce broad/bimodal MWD polyethylene resins in a single reactor. The LMW polymer component in the resin is produced by the Zr active centers, while the HMW polymer component is produced by the Ti active centers. The relative productivity of the two active centers determines the ratio of the HMW and the LMW polymer components in the final resin.

This invention includes a new procedure for preparing bimetallic catalysts. Herein, bimetallic (containing two transition metals) catalyst precursors are produced without isolating the titanium component prior to introduction of the zirconocene component. Activated bimetallic catalyst precursors exhibit good productivity and produce resins with a bimodal MWD. The low molecular weight polymer component in the resin is produced by the zirconocene active centers while the high molecular weight polymer component is produced by the Ti-based centers. Typically, the bimetallic catalyst precursor is prepared in two steps. First, the titanium component is prepared and isolated as a free-flowing powder. Then the zirconium component is added to the titanium component to form the final bimetallic catalyst precursor. The one-stage incorporation of each of the two metals onto a support to produce the bimetallic catalyst precursors of this invention greatly reduces the batch time of the catalyst preparation. Moreover, in preferred bimetallic catalysts prepared according to this invention, the zirconium catalyst component is contacted with a trialkylaluminum compound such as trimethylaluminum (TMA) or triethylaluminum (TEAL) prior to addition to the titanium catalyst component. This step is carried out in the absence of methylalumoxane (MAO). Bimetallic catalysts prepared with this procedure have significantly higher activity than catalysts prepared without this particular step.

DESCRIPTION OF THE DRAWINGS

Each of FIGS. 1, 2, and 3 is a $^{13}$C NMR spectrograph.

DETAILED DESCRIPTION OF THE INVENTION

Catalyst Composition

Figure 1:
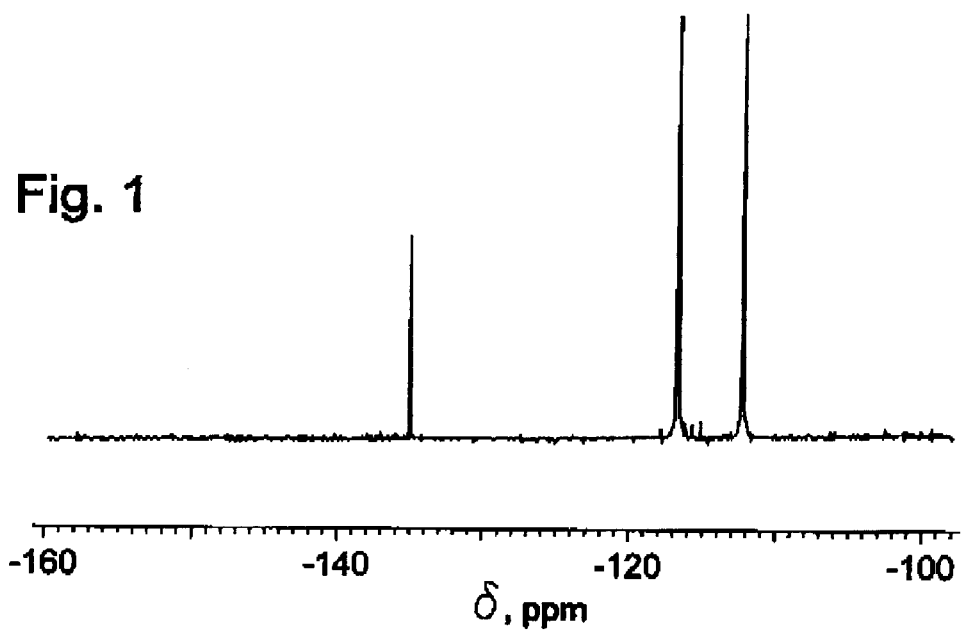
FIG. 1 depicts the $^{13}$C NMR of $(n\text{-BuCp})_2\text{ZrCl}_2$ in $\text{CDCl}_3$.
Figure 2:
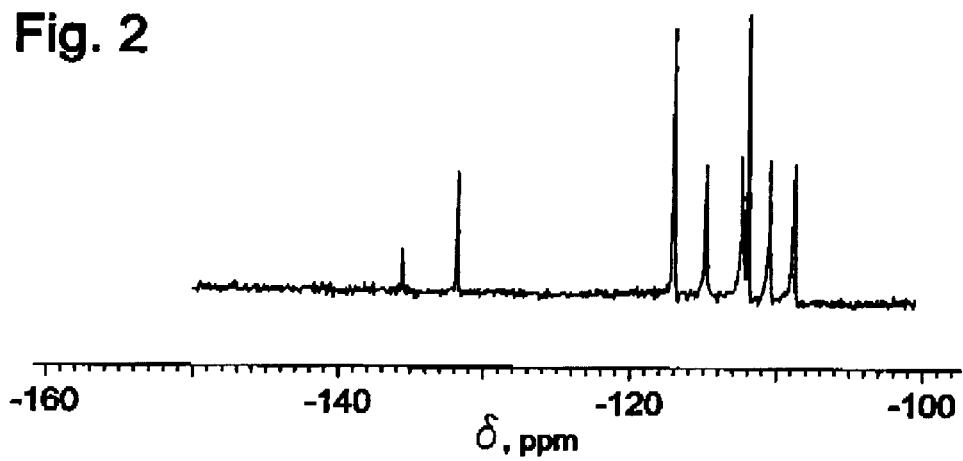
FIG. 2 depicts $(n\text{-BuCp})_2\text{ZrCl}_2$-TMA, 1:10 solution in heptane and the spectrograph of FIG. 3 depicts $(n\text{-BuCp})_2\text{ZrCl}_2$-TEAL, 1:10 solution in heptane.
Figure 3:
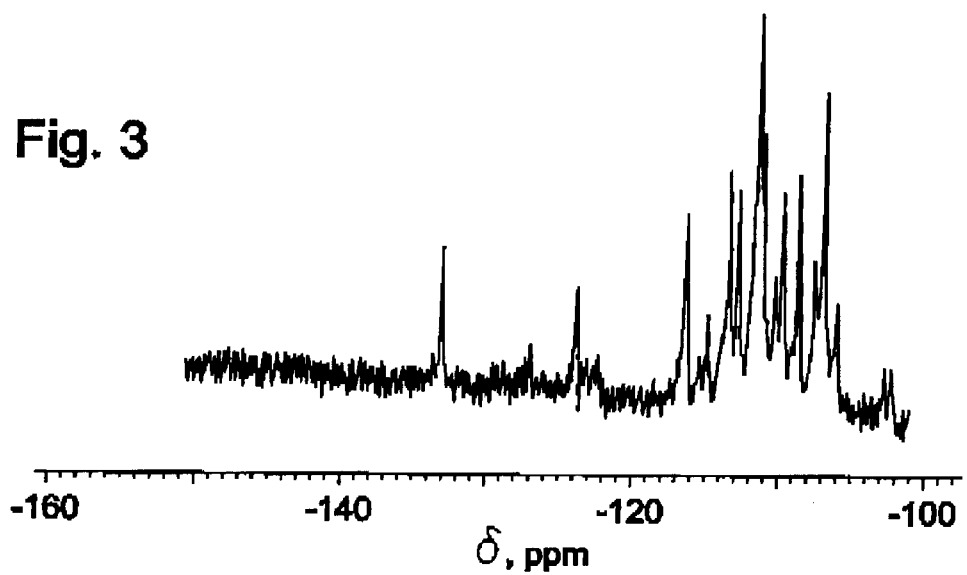

The catalysts of the invention comprise a cocatalyst comprising an aluminumalkyl compound, such as a trialkylaluminum compound which is free of alumoxane, and a solid catalyst precursor comprising a carrier, an alumoxane, at least one metallocene transition metal source and a non-metallocene transition metal source. The loading of the first transition metal provided by a metallocene compound ranges from 0.01 to 1.0 wt % metal in the final catalyst precursor, preferably from 0.10 to 0.60 wt % metal and more preferably from 0.20 to 0.40 wt % metal; the loading of the second transition metal ranges from 0.10 to 10.0 wt % metal in the final catalyst precursor, preferably from 0.40 to 5.0 wt % metal and more preferably from 0.70 to 3.0 wt % metal. The two transition metal sources exhibit different hydrogen responses under ethylene polymerization conditions, and produce at least two polymer components of different molecular weights.

The carrier material for the catalyst is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram (m²/g), and preferably from at least 50 m²/g up to 350 m²/g. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C., and most preferably at about 600° C. The carrier material must have at least some active hydroxyl (OH) groups on its surface to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 4–16 hours to achieve a surface hydroxyl group concentration of about 0.7 millimoles per gram (mmol/g). The silica of the most preferred embodiment is a high surface area, amorphous silica (surface area=300 m$^2$/g; pore volume of about 1.65 cm$^3$/g), and it is a material marketed under the tradenames of Davison 952 or Davison 955 by the Davison Chemical Division of W.R. Grace and Company. The silica is in the form of spherical particles, which are obtained by a spray-drying process. As procured, these silicas are not calcined and thus must be dehydrated as indicated above.

The catalyst synthesis is undertaken under inert conditions in the absence of water and of oxygen. First, the carrier material is slurried in a non-polar solvent. Suitable non-polar solvents are alkanes, such as isopentane, isohexane, hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane.

Prior to use, the non-polar solvent should be purified, such as by percolation through silica gel and/or molecular sieves, to remove traces of water, oxygen, polar compounds, and other materials capable of adversely affecting catalyst activity. The slurry of the carrier material is prepared by introducing the carrier into the solvent, preferably while stirring, and heating the mixture to a temperature not exceeding 90° C., preferably to 40–60° C. The temperature of the slurry is critical with respect to the activity of the non-metallocene transition metal which is subsequently added: if the temperature of this slurry exceeds 90° C., it will result in deactivation of the transition metal component added subsequently. Accordingly, all catalyst precursor synthesis steps are conducted below 90° C.

The slurry is contacted with at least one organomagnesium compound, while the heating is continued as indicated.

The organomagnesium compound has the empirical formula

$$R_mMgR'_n$$

where R and R' are the same or different $C_2$–$C_{12}$ alkyl groups, preferably $C_4$–$C_{10}$ alkyl groups, more preferably $C_4$–$C_8$ alkyl groups, and most preferably both R and R' are mostly butyl groups, and m and n are each 0, 1 or 2, providing that m+n is equal to the valence of Mg.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected in the solvent.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier.

It is also possible to add such an amount of the organomagnesium compound which is in excess of that which will be deposited onto the support, and then remove, e.g., by filtration and washing, any excess of the organomagnesium compound. However, this alternative is less desirable than the most preferred embodiment described above.

The organomagnesium-treated support is contacted with an organic alcohol (ROH) which is capable of displacing alkyl groups on the magnesium atom. The amount of the alcohol is effective to provide a ROH:Mg molar ratio of 0.5 to 2.0, preferably 0.8 to 1.5 and most preferably 0.90 to 1.0.

Contact of the silica-supported magnesium compound with the alcohol is also undertaken in the slurry, at a temperature ranging from 25° C. to 80° C., preferably 40° C. to 70° C.

The alkyl group in the alcohol can contain from 1 to 12 carbon atoms, preferably from 2 to 8; in the embodiments below, it is an alkyl group containing 2 to 4 carbon atoms, particularly 4 carbon atoms (butyl group). The inclusion of the alcohol addition step in the catalyst synthesis of the invention produces a catalyst which, relative to the absence of this step, is much more active and requires a much lower concentration of the non-metallocene transition metal (e.g. titanium).

Also, the inclusion of the alcohol addition step in the catalyst synthesis provides a HMW polymer component with a relatively narrow MWD relative to the HMW polymer component produced with a catalyst prepared without the alcohol addition step. A HMW polymer component with a relatively narrow MWD is required in a resin with a bimodal MWD in order to produce a resin with good bubble stability in the film-forming process.

After the addition of the alcohol to the slurry is completed, the slurry is contacted with the first transition metal source, a non-metallocene transition metal compound. Again, the slurry temperature must be maintained at about 25 to about 70° C., preferably to about 40 to about 60° C. Suitable non-metallocene transition metal compounds used herein are compounds of metals of Groups 4A, and 5A, of the Periodic Chart of the Elements, as published by Chemical and Engineering News, 63(5), 27, 1985, providing that such compounds are soluble in non-polar solvents. Non-limiting examples of such compounds are titanium and vanadium halides, e.g., titanium tetrachloride, vanadium tetrachloride, vanadium oxytrichloride, or titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of the titanium or vanadium component ranges from a molar ratio with respect to Mg of 0.3 to 1.5, preferably from 0.50 to 0.80.

Mixtures of non-metallocene transition metal compounds may also be used and generally no restrictions are imposed on the transition metal compounds which may be included. Any transition metal compound that may be used alone may also be used in conjunction with other transition metal compounds.

After the addition of the non-metallocene transition metal compound is complete, the precursor remains in the slurry. It is treated with three additional ingredients, a trialkylaluminum compound $AlR_3$, a metallocene complex, and methylalumoxame (MAO).

The metallocene complex is added after or concurrently with the trialkylaluminum compound. The introduction of the trialkylaluminum compound is a critical component in this synthesis as it improves the productivity of the bimetallic catalyst.

Preferably, the alkylaluminum compound is a trialkylaluminum compound in which the alkyl groups contain 1 to 10 carbon atoms, e.g. methyl, ethyl, propyl, i-propyl, butyl, isobutyl, pentyl, isopentyl, hexyl, isohexyl, heptyl, isoheptyl, octyl, or isooctyl. Most preferably, this component is trimethylaluminum. The molar ratio of the trialkyaluminum compound to transition metal compound provided by the metallocene compound, can range from 0.50 to 50, preferably from 1.0 to 20, and most preferably from 2.0 to 15. The amount of the trialkylaluminum compound used in combination with the metallocene transition metal source is sufficient to increase the productivity of the catalysts.

The metallocene compound has the formula $Cp_xMA_yB_z$ in which Cp is an unsubstituted or substituted cyclopentadienyl group, M is zirconium or hafnium atom and A and B belong to the group including a halogen atom, hydrogen atom or an alkyl group. In the above formula of the metallocene compound, the preferred transition metal atom M is zirconium. In the above formula of the metallocene compound, the Cp group is an unsubstituted, a mono- or a polysubstituted cyclopentadienyl group: and x is at least 1 and preferably is 2. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen atoms, —$Si(CH_3)_2$—, —$Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine; and y+z is 3 or less, provided that x+y+z equals the valence of M. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl) metal dihalides wherein the metal is zirconium or hafnium atom, halide groups are preferably chlorine and the alkyl groups are $C_1$–$C_6$ alkyls. Illustrative, but non-limiting examples of metallocenes include bis (cyclopentadienyl)zirconium dichloride, bis (cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis (n-butylcyclopentadienyl)hafnium hydridochloride, bis(pentamethylcyclopentadienyl)zirconium dichloride, bis(pentamethylcyclopentadienyl)hafnium dichloride, cyclopentadienyl-zirconium trichloride, bis(indenyl) zirconium dichloride, bis(4,5,6,7-tetrahydro-1-indenyl) zirconium dichloride, and ethylene-[bis(4,5,6,7-tetrahydro-1-indenyl)]zirconium dichloride. The bimetallic catalyst precursors of the invention may be prepared using a Zr component prepared by pre-mixing the zirconium complex, e.g., $(n-BuCp)_2ZrCl_2$ with TMA. Some metallocene complexes, although scarcely soluble in paraffinic hydrocarbons, can be readily dissolved in them in the presence of a trialkylaluminum compound.

MAO is also introduced into the slurry of the carrier. Preferably, it is added either concurrently with the metallocene complex or after the metallocene addition. If MAO is introduced with the metallocene complex, then the trialkylaluminum compound, e.g. trimethylaluminum, should be previously introduced into the slurry, If the alumoxane is introduced into the slurry after the metallocene complex, then the metallocene complex should be treated with the trialkylaluminum compound, e.g. trimethylaluminum, prior to the addition of MAO. In this embodiment, the amount of Al, provided by MAO, is sufficient to provide an [Al]: [transition metal] provided by the metallocene molar ratio ranging from 50 to 500, preferably 75 to 300.

Finally, the solvent is removed from the impregnated catalyst precursor by heating and/or under a positive pressure induced by an inert gas, such as nitrogen, at 40–50° C. The conditions in this step are closely controlled to reduce or eliminate agglomeration of impregnated catalyst particles and/or crosslinking of the alumoxane. Although solvent can be removed by evaporation at relatively higher temperatures than that defined by the range above 40° C. and below about 50° C., very short heating times schedules must be employed.

The molar ratio of alumoxane provided by aluminum, expressed as Al, to metallocene metal expressed as M (e.g. Zr), ranges from 50 to 500, preferably 75 to 300, and most preferably 100 to 200. In a preferred embodiment, the alumoxane and the metallocene compound are mixed at a temperature of about 20 to 80° C., for 0.1 to 6.0 hours prior to use. The solvent for the metallocene and alumoxane mixture can be aromatic hydrocarbons, halogenated aromatic hydrocarbons, ethers, cyclic ethers or esters, preferably it is toluene.

In the most preferred embodiment, the metallocene component is mixed with a trialkylaluminum compound such as TMA in a paraffinic hydrocarbon containing 5 to 12 carbon atoms, preferably isopentane, isohexane, hexane and heptane, in the absence of MAO. This mixture is then added to the titanium catalyst component. The MAO is added as a toluene solution as the final step in the catalyst preparation. The catalyst precursor formed from the organomagnesium compound, the non-metallocene transition metal compound and the activated metallocene complex, must be activated with a cocatalyst, which is an alkylaluminum compound free of water and an alumoxane. The cocatalyst is preferably a trialkylaluminum compound, preferably it is TMA. The amount of TMA is sufficient to give an Al:Ti molar ratio of about 10:1 to about 1000:1, preferably about 15:1 to about 300:1, and most preferably about 20:1 to about 100:1.

The catalyst precursor of this invention is in particulate form; it can be fed to the fluidized bed reactor for gas phase polymerizations and copolymerizations of ethylene in the absence of additional alumoxane fed as a separate component to the fluidized-bed reactor.

EXAMPLES

Catalyst Precursor Preparation

Example 1

Into a Schlenk flask were added Davison-grade 955 silica (2.00 g), which was previously calcined at 600° C. for 4 h, and heptane (60 ml). The flask was placed into an oil bath kept at 55° C. Dibutylmagnesium (1.44 mmol) was added to the stirred silica slurry at 55° C. and stirring was continued for 1 h. 1-Butanol (1.368 mmol; butanol/Mg molar ratio of 0.95) was added at 55° C. and the mixture was stirred for another 1 h. Then $TiCl_4$ (0.864 mmol) was added at 55° C. to the reaction medium and stirring was continued for 1 h. The flask was removed from the oil bath and allowed to cool to ambient temperature. Then a heptane solution (1.8 ml) containing TMA (2.38 mmol) and $(n-BuCp)_2ZrCl_2$ (0.1904 mmol, 0.077 g) was added to the mixture. After stirring for 1 h, MAO (19.04 mmol Al) in toluene solution was added to the mixture and stirring was continued for 0.6 h. Then the flask was placed into an oil bath at 55° C. and the solvent mixture was removed under a nitrogen purge to give a free-flowing brown powder.

Example 2

The catalyst precursor was prepared as in Example 1 up to and including the $TiCl_4$ step. After removing the flask from the oil bath and allowing it to cool to ambient temperature, a toluene solution (4.4 ml) containing MAO (19.04 mmol Al) and $(n-BuCp)_2ZrCl_2$ (0.1904 mmol, 0.077 g) was added to the mixture. After stirring for 1 h, the flask was placed into an oil bath (50° C.) and the solvents were removed under a nitrogen purge to give a free-flowing brown powder.

Example 3

The catalyst precursor was prepared as in Example 1 up to and including the $TiCl_4$ step. After removing the flask from the oil bath and allowing it to cool to ambient temperature, TMA (2.38 mmol) was added to the mixture. After stirring for 1 h, a toluene solution (4.4 ml) containing MAO (19.04 mmol Al) and $(n-BuCp)_2ZrCl_2$ (0.1904 mmol, 0.077 g) was added to the mixture. After stirring for 1 h, the flask was placed into an oil bath (50° C.) and the solvents were removed under a nitrogen purge to give a free-flowing brown powder.

Example 3A

Into a Schlenk flask were added Davison-grade 955 silica (2.50 g), which was previously calcined at 600° C. for 4 h, and heptane (90 ml). The flask was placed into an oil bath kept at 50° C. Dibutylmagnesium (1.80 mmol) was added to the stirred silica slurry at 49° C. and stirring was continued for about 1 h. 1-Butanol (2.16 mmol; butanol/Mg molar ratio of 1.2) was added at 49° C. and the mixture was stirred for 1 h. Then $TiCl_4$ (1.08 mmol) was added at 49° C. to the reaction medium and stirring was continued for 1 h. The flask was removed from the oil bath and allowed to cool to room temperature. Then a heptane solution of TMA (4.30 mmol) was added to the flask and stirring was continued for 1 h. Finally, a toluene solution of MAO (20.30 mmol Al) containing $(n-BuCp)_2ZrCl_2$ (0.203 mmol) was added to the slurry. Then all solvents were removed with a stream of nitrogen to produce a free-flowing powder.

Example 4

The catalyst precursor was prepared as in Example 1 up to and including the $TiCl_4$ step. After removing the flask from the oil bath and allowing it to cool to ambient temperature, MAO in toluene solution (19.04 mmol Al) was added to the mixture. After stirring for 1 h, a heptane solution (1.8 ml) containing TMA (2.38 mmol) and $(n-BuCp)_2ZrCl_2$ (0.1904 mmol, 0.077 g) was added to the mixture at ambient temperature. Then the flask was placed into an oil bath (55° C.); and the solvents were removed under a nitrogen purge to give a free-flowing brown powder.

Example 5

The catalyst precursor was prepared as in Example 1 except triethylaluminum (TEAL, 2.38 mmol) was used in place of TMA.

The preparative scheme for Examples 1–5 are illustrated below.

| Example 1 | | | | | | | |
|---|---|---|---|---|---|---|---|
| 955-600 silica | heptane --------> | DBM ------> | 1-butanol --------> | $TiCl_4$ -------> | {TMA + $(n-BuCp)_2ZrCl_2$} --------------------> | MAO -----> | dry ----> |
| Example 2 | | | | | | | |
| 955-600 silica | heptane --------> | DBM ------> | 1-butanol --------> | $TiCl_4$ -------> | {MAO + $(n-BuCp)_2ZrCl_2$} --------------------> | | dry ----> |

-continued

Example 3 and 3A

| 955-600 silica | heptane --------> | DBM ------> | 1-butanol --------> | TiCl$_4$ -------> | TMA -------------> | {MAO + (n-BuCp)$_2$ZrCl$_2$} ----------------------> | dry ------> |

Example 4

| 955-600 silica | heptane --------> | DBM ------> | 1-butanol ----------> | TiCl$_4$ -------> | MAO ----------> | {TMA + (n-BuCp)$_2$ZrCl$_2$} ----------------------> | dry ------> |

Example 5

| 955-600 silica | heptane --------> | DBM ------> | 1-butanol ----------> | TiCl$_4$ -------> | {TEAL + (n-BuCp)$_2$ZrCl$_2$} ----------------------> | MAO -------> | dry -----> |

Some embodiments of the present invention involve the use of metallocene complex solutions in paraffinic hydrocarbons (Examples 1, 4, and 5). All metallocene complexes are practically insoluble in such liquids by themselves but some of them become soluble when contacted with trialkylaluminum compounds.

Example 6

0.1904 mmol (0.077 g) of (n-BuCp)$_2$ZrCl$_2$ was added to a 10-ml serum bottle, flushed with nitrogen followed by addition of 1.8 ml of TMA solution in heptane (2.38 mmol). The metallocene complex quickly dissolved to form a yellow solution.

Example 7

0.230 mmol (0.0933 g) of (n-BuCp)$_2$ZrCl$_2$ was added to an NMR tube, flushed with nirtogen followed by addition of 2 ml of n-heptane. The metallocene complex did not dissolve. Then, 2.3 ml of TMA solution in heptane (1.70 mmol) was added to the tube. The metallocene complex quickly dissolved. The $^{13}$C NMR spectrum of the solution was recorded and compared to the spectrum of the pure (n-BuCp)$_2$ZrCl$_2$ complex (solution in deuterated chloroform). Whereas the spectrum of pure (n-BuCp)$_2$ZrCl$_2$ contains only three signals in the Cp carbon atom range, at −135.2, −116.8 and −112.4 ppm, the spectrum of the contact product from (n-BuCp)$_2$ZrCl$_2$ and TMA contains eight signals at −135.5, −131.7, −117.0, −114.8, −112.5, −112.0, −110.6 and −108.8 ppm. This difference proves that the (n-BuCp)$_2$ZrCl$_2$-TMA contact product is a unique entity.

Example 8

Dissolution of (n-BuCp)$_2$ZrCl$_2$ in heptane was carried out as in Example 6 except that 2.38 mmol of TEAL was used in place of TMA. The metallocene complex rapidly dissolved to form a yellow solution.

Example 9

0.272 mmol (0.1097 g) of (n-BuCp)$_2$ZrCl$_2$ was added to an NMR tube, flushed with nitrogen followed by addition of 2 ml of n-heptane. The metallocene complex did not dissolve. Then, 2.0 ml of TEAL solution in heptane (3.06 mmol) was added to the tube. The metallocene complex quickly dissolved. The $^{13}$C NMR spectrum of the solution was recorded and compared to the spectrum of pure (n-BuCp)$_2$ZrCl$_2$. The spectrum of the contact product from (n-BuCp)$_2$ZrCl$_2$ and TEAL contains fifteen signals in the Cp carbon atom area encompassing the −126.2–−104.4 ppm range. This difference with the spectrum of pure (n-BuCp)$_2$ ZrCl$_2$ (see Example 7) proves that the (n-BuCp)$_2$ZrCl$_2$-TEAL contact product is a unique entity.

Example 10

An attempt of dissolution of Cp$_2$ZrCl$_2$ in heptane was carried out as in Example 6. 0.1904 mmol (0.056) of Cp$_2$ZrCl$_2$ was used instead of (n-BuCp)$_2$ZrCl$_2$. In this case, however, the metallocene complex remained insoluble, hence, a catalyst preparation technique similar to that of Examples 1, 4 and 5 cannot be applied with this complex.

Slurry Polymerization Reactions

Ethylene/1-hexene copolymers were prepared with the bimetallic catalyst precursors and the cocatalyst TMA. An example is given below.

A 1.6 liter stainless-steel autoclave equipped with a magnet-drive impeller stirrer was filled with heptane (750 ml) and 1-hexene (30 ml) under a slow nitrogen purge at 50° C. and then 2.0 mmol of TMA was added. The reactor vent was closed, the stirring was increased to 1000 rpm, and the temperature was increased to 95° C. The internal pressure was raised 6.0 psi with hydrogen and then ethylene was introduced to maintain the total pressure at 204 psig. After that, the temperature was decreased to 85° C., 37.6 mg of the catalyst precursor of Example 1 was introduced into the reactor with ethylene over-pressure, and the temperature was increased and held at 95° C. The polymerization reaction was carried out for 1 h and then the ethylene supply was stopped. The reactor was cooled to ambient temperature and the polyethylene was collected.

The slurry polymerization results for these catalysts are given below.

| Catalyst Precursor | Productivity g/g-h | Flow Index (I$_{21}$) | MFR |
|---|---|---|---|
| Example 1 | 3310 | 19.4 | 139 |
| Example 2 | 2170 | 29.7 | 138 |
| Example 3 | 3080 | 18.4 | 142 |
| Example 3A | 3300 | 2.0 | 54 |
| Example 4 | 1670 | 9.2 | 82 |
| Example 5 | 1820 | 3.4 | 57 |

All the catalyst systems produce resins with bimodal MWDS. Relative contributions of the components can be judged by the flow index of the resin: the higher the flow index, the higher the contribution of the Zr component. The efficiency of the Zr component is much higher for the catalyst systems of Examples 1–3, as evident from their higher resin flow indexes. Adding TMA prior to the addition of MAO in the catalyst precursor preparation resulted in the most active catalysts (Examples 1,3). In contrast, adding MAO before TMA addition in the catalyst precursor preparation (Example 4) had a deleterious effect on the catalyst productivity. The catalyst precursors of Examples 1 and 4 are unique in that the (n-BuCp)$_2$ZrCl$_2$ complex is reacted with TMA and not pre-mixed with MAO. Using TEAL (Example 5) in place of TMA in the catalyst precursor preparation produced a catalyst system with low Zr efficiency as manifested by a low resin flow index.

Thus it is apparent that there has been provided, in accordance with the invention, a synthesis, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for preparing a bimetallic catalyst, the process comprising:
   (a) providing a slurry of a supported non-metallocene catalyst by:
      (i) preparing a slurry of a dehydrated support material in a non-polar hydrocarbon selected from the group consisting of C$_4$–C$_{10}$ linear or branched alkanes, and cycloalkanes;
      (ii) contacting the slurry of (i) with an organomagnesium compound RMgR', where R and R' are the same or different C$_2$–C$_{12}$ alkyl groups; and
      (iii) contacting the slurry of (ii) with a non-metallocene compound of a Group 4 or Group 5 transition metal;
   (b) contacting the slurry of the supported non-metallocene catalyst in a non-polar hydrocarbon with a solution of a substituted, unbridged bis-cyclopentadienyl metallocene compound and methylalumoxane in an aromatic solvent; and
   (c) drying the product of (b) to obtain a supported bimetallic catalyst.

2. The process of claim 1, wherein the support material is silica.

3. The process of claim 1, wherein the organomagnesium compound is dibutylmagnesium.

4. The process of claim 1, further comprising before step (iii), contacting the slurry of (ii) with an alcohol R"OH, where R" is a C$_1$–C$_{12}$ alkyl group.

5. The process of claim 4, wherein the alcohol is n-butanol.

6. The process of claim 4, wherein the alcohol is used in an amount of 0.5 to 2.0 moles per mole of magnesium provided by the organomagnesium compound.

7. The process of claim 1, wherein the Group 4 or 5 transition metal is titanium or vanadium.

8. The process of claim 7, wherein the non-metallocene transition metal compound is a titanium halide, a titanium alkoxyhalide, a vanadium halide, or a vanadium alkoxyhalide.

9. The process of claim 1, wherein the non-metallocene transition metal compound is used in an amount to provide from 0.3 to 1.5 moles of the Group 4 or 5 transition metal per mole of magnesium provided by the organomagnesium compound.

* * * * *